United States Patent
Devic

Patent Number: 6,072,508
Date of Patent: *Jun. 6, 2000

[54] METHOD AND APPARATUS FOR SHORTENING DISPLAY LIST INSTRUCTIONS

[75] Inventor: Goran Devic, Austin, Tex.

[73] Assignee: S3 Incorporated, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/818,053

[22] Filed: Mar. 14, 1997

[51] Int. Cl.$^7$ .................................................. G06F 15/00
[52] U.S. Cl. ........................... 345/522; 345/513; 345/515
[58] Field of Search .................................... 345/522, 513, 345/507, 515, 516, 521, 509

[56] References Cited

U.S. PATENT DOCUMENTS

| | | | |
|---|---|---|---|
| 4,583,185 | 4/1986 | Heartz et al. | 364/521 |
| 4,586,038 | 4/1986 | Sims | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 5,126,726 | 6/1992 | Howard et al. | 340/728 |
| 5,187,754 | 2/1993 | Currin et al. | 382/54 |
| 5,191,642 | 3/1993 | Quick et al. | 395/127 |
| 5,268,996 | 12/1993 | Steiner et al. | 395/126 |
| 5,293,467 | 3/1994 | Buchner et al. | 395/122 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |
| 5,657,479 | 8/1997 | Shaw et al. | 345/526 |
| 5,706,478 | 1/1998 | Dye | 345/503 |
| 5,793,386 | 8/1998 | Larson et al. | 345/522 |

FOREIGN PATENT DOCUMENTS

WO 96/36011   11/1996   WIPO ............................ G06T 3/00

OTHER PUBLICATIONS

*Based on U.S. app. 08/438,860 filed May 10, 1995.

*Primary Examiner*—Kee M. Tung
*Attorney, Agent, or Firm*—Fenwick & West LLP

[57] ABSTRACT

A graphics system includes a graphics processor for rendering graphics primitives with a shortened display list. A host processor generates a display list which includes a field load instruction for loading the display list into a register file. The graphics processor includes logic to encode and decode the field load instruction thereby shortening the display list loaded into the register file. The field load instruction may also be decoded to allow the graphics processor to randomly load the register file thereby shortening the processing of the display list.

5 Claims, 4 Drawing Sheets

METHOD AND APPARATUS FOR SHORTENING DISPLAY LIST INSTRUCTIONS

FIELD OF INVENTION

The present invention relates generally to a graphics system for personal computers. More particularly, the present invention relates to a method and apparatus for shortening display list instructions in a graphics processor.

DESCRIPTION OF THE RELATED ART

Sophisticated graphics packages have been used for some time in expensive computer design and graphics systems. Increased capabilities of graphics controllers and display systems, combined with standardized graphics languages, have made complex graphics functions available in even the most routine applications. For example; word processor, spread sheets and desktop publishing packages now include relatively sophisticated graphics capabilities. Three-dimensional (3D) displays have become common in games, animation, and multimedia communication and drawing packages.

The availability of sophisticated graphics in PCs has driven a demand for even greater graphics capabilities. To obtain these capabilities, graphics systems must be capable of performing more sophisticated functions in less time to process greater amounts of graphical data required by modern software applications. In particular, there is a continuing need for improvements in software algorithms and hardware implementations to draw three-dimensional objects using full color, texture mapping and transparency blending.

Improvements have been made in the hardware realm. Graphics processors and accelerators are available with software drivers that interface with a host central processing unit to the graphics processor. In general, the software receives information for drawing objects on a computer screen, calculates certain basic parameters associated with the objects and provides this to the graphics processor in the form of a "display list" of parameters. A graphics controller then uses the display list values in generating the graphics to be displayed. A graphics processor may use interpolation techniques where the fundamental information for the object to be drawn comprises a series of initial and incremental parameters or values. The graphics processor loads or otherwise receives the initial parameters for the pixels to be drawn, interpolate the object by incrementing the parameters until the object is completely drawn.

In many prior art computer systems, external devices such as graphics devices are able to read a stream of data (display list) from memory and execute programs stored in the memory in a similar manner. The size of these display list information tend to place limitations on the traversal (read/write) speed of the central processing unit and the graphics processor.

The CPU typically builds the display list information with the instructions and parameters specific to the particular external device attached to the computer system. The external device then reads the instruction stream and executes instructions from this stream. One of the common operations stored in the display list is a command to load single and multiple registers of a device's register file with specified values.

Existing graphics implementation that use display lists typically load data in a sequential format to a register file in the graphics processor. For each type of primitive, a particular set of data values are required to render that type of primitive. For example, a point to be drawn to a pixel grid requires an X,Y location, color values and a Z value for depth comparison. An example of display list is shown below in Table I.

TABLE I

| ADDRESS | NAME | DESCRIPTION |
|---------|------|-------------|
| 0x4000 | X | Initial X value |
| 0x4004 | Y | Initial Y value |
| 0x4008 | Z | Initial Z value |
| 0x400C | R | Initial Red component |
| 0x4010 | G | Initial Green component |
| 0x4014 | B | Initial Blue component |
| 0x4018 | X1 | Some other register |
| 0x401C | X2 | -\|\|- |
| 0x4020 | A | Alpha blending value |

The display list in Table I provides the parameters required to draw points, lines and polygons. From the display list provided above, if a specific primitive rendering operation requires, for example, only the following register values to be loaded (e.g., X, Y, R, G, B and A); a prior art load instruction would use one of two alternative methods of instruction loading.

The first of the two alternatives will be to load all nine registers (e.g., "Load instruction (start at X), X, Y, Z, R, G, B, X1, X2, A"). The stream of information in the display list will therefore occupy 10 instruction words (40 bytes) and load unnecessary registers.

The second load alternative is to use two consecutive load operations thereby replacing the two register load gaps (e.g., X1, X2) with only one load instruction (e.g., "Load instruction (start at X), X, Y, Z, R, G,B" and "Load instruction (starts at A), A"). The stream of information in the display list for this load sequence is 9 instruction words long (36 bytes). These two prior art instruction load methods have the common feature of sequentially loading the register file with the parameter values for the primitive being rendered. Also, the load instructions comprise two fields; a first field which holds the starting parameter value and a second field which holds the incremental count of subsequent parameter values for the primitive being rendered.

Despite these prior methods, instruction load operations and the ability to load multiple registers contiguously to enable the efficient processing of the display list, several problems emerge when the size of the display list gets too large.

One of such problems is that extra system memory may be needed to store the large display list. This may impose extra cost in the overall price of the computer system. Although memory prices are getting a bit cheaper, the average amount of memory installed in many of today's multimedia computer systems continue to substantially increase. For example, a Pentium® based multimedia computer system running MS Windows® NT may require about at least 32 megabytes of memory to run efficiently.

As the memory requirements of these multimedia systems continue to grow, the memory required to maintain and execute very long display lists needed by the multiprogramming operating systems in these computer systems become very significant. Moreover, since the memory in these systems may become locked, (i.e., the operating system is not able to swap processing to the computer system's external storage device). Such a lock further reduces the amount of memory that is left for the computer system to process other system activities.

Another problem with the presence of long display list is the time needed by the CPU to build the list and for the external device to execute the list. If a high frame rate and fast response time is needed by the CPU, the time spent managing the display list must be minimized. The amount of information that is being transferred between the CPU and the external device should not be sacrificed since the approach would definitely affect the quality of the image being rendered. Even if the setting is other than for computer graphics, the amount of information may be the same since the external device may need it all.

As more and more of the computer's processing power is transferred to the central processing unit, the processing of long display lists to generate graphics display end up being bottlenecks in processing instructions by the CPU. This problem becomes even more pronounce if the processing of graphics data is transferred from a separate graphics processing chip off device to the CPU.

Thus, a method of shortening display list information without losing the quality of the information being passed, while maintaining the processing speed of CPU is needed. The present invention provides the advantageous functionality of shortening display list information and the ability to randomly load register file in graphics processing device with a single load instruction.

SUMMARY OF THE INVENTION

A method and apparatus are described herein which reduce processing time while maintaining the quality of display information and without requiring extra system memory. In accordance with the present invention, a graphics processor for generating shorter display list instructions without losing the quality of the display information supplied to a display screen is disclosed. The graphics processor provides a field load instruction which is generated by a central processing unit which is supplied to the graphics processor. The field load instruction is then encoded into the display list instruction for subsequent execution by an external graphics device in a computer system. By providing a short display list, the present invention provides a system which is able to handle the increasing amount of graphics data processed in many present day multimedia computer systems, without requiring excessive amount of memory resources.

Another embodiment is a computer controlled graphics display system having a processor coupled to a bus, a memory unit coupled to the bus for storing the display list, a graphics processor for receiving microinstructions from the display list stored in the memory unit, a set of register files coupled to the graphics processor for storing the shortened display list in the graphics processor, and a private memory area disposed within the memory unit for storing address offsets of the display list; wherein named instructions generated by the central processor replace other means of randomly loading the register file in the graphics processor.

Embodiments further include the above; wherein the display list comprises parameterization procedures for processing polygon primitives, sets of graphics lines, and sets of graphics points; and wherein the parameterization procedure are further for processing translation between different graphics formats.

Embodiments further include the above; wherein the load instruction comprises instruction bit-field for performing specific instructions by the display list.

Embodiment further include the above; wherein the load instruction further comprises an opcode bit-field for storing data representing opcode instruction in the display list.

Embodiments further include the above; wherein the load instruction further comprise an partition bit-field for storing partition data defining the partition index of the display list to the private memory area.

The graphics processor also preferably includes an internal instruction execution unit that receives the opcode from a prefetch unit and decodes the opcode. The execution unit also receives the display list and stores the display list in a register file.

DETAIL DESCRIPTION OF THE PRESENT INVENTION

A method and apparatus for providing shorter display lists without losing the quality of the display information supplied to the graphics device is disclosed.

In the following detailed description of the present invention, numerous specific details are set forth in order to provide a thorough understanding of the present invention. However, it will be obvious to one skilled in the art that the present invention may be practiced without these specific details or by using alternate elements or methods. In other instances well know methods, procedures, components, and circuits have been described in detail as not to unnecessarily obscure aspects of the present invention.

Some portions of the detailed description which follow are represented in terms of procedures, logic blocks, processing, and other symbolic representations of operations on data bits within a computer system. These descriptions and representations are the means used by those skilled in the art to most effectively convey the substance of their work to other skilled in the art. A procedure, logic block, process etc., is herein, and generally, conceived to be a self-consistent sequence of steps or instructions leading to a desired result. The steps are those requiring physical manipulations of physical quantities. Usually, magnetic signals capable of being stored, transferred, combined, compared, and otherwise manipulated in a computer system. For reasons of convenience, and with reference to common usage, these signals are referred to as bits, values or the like with reference to the present invention.

It should be borne in mind, however, that all of these terms are to be interpreted as referencing physical manipulations and quantities and merely convenient labels and are to be interpreted further in view of terms commonly used in the art. Unless specifically stated otherwise as apparent from the following discussions, it is understood that thorough discussions of the present invention, discussions utilizing terms such as "processing" or "computing" or "calculating" or "determining" or "displaying" or the like, refer to the action and processes of a computer system, or similar electronic computing device, that manipulates and transforms data. The data is represented as physical (electronic)

quantities within the computer system's registers and memories and is transformed into other data similarly represented as physical quantities within the computer system memories or registers or other such information storage, transmission or display devices.

Figure 1:
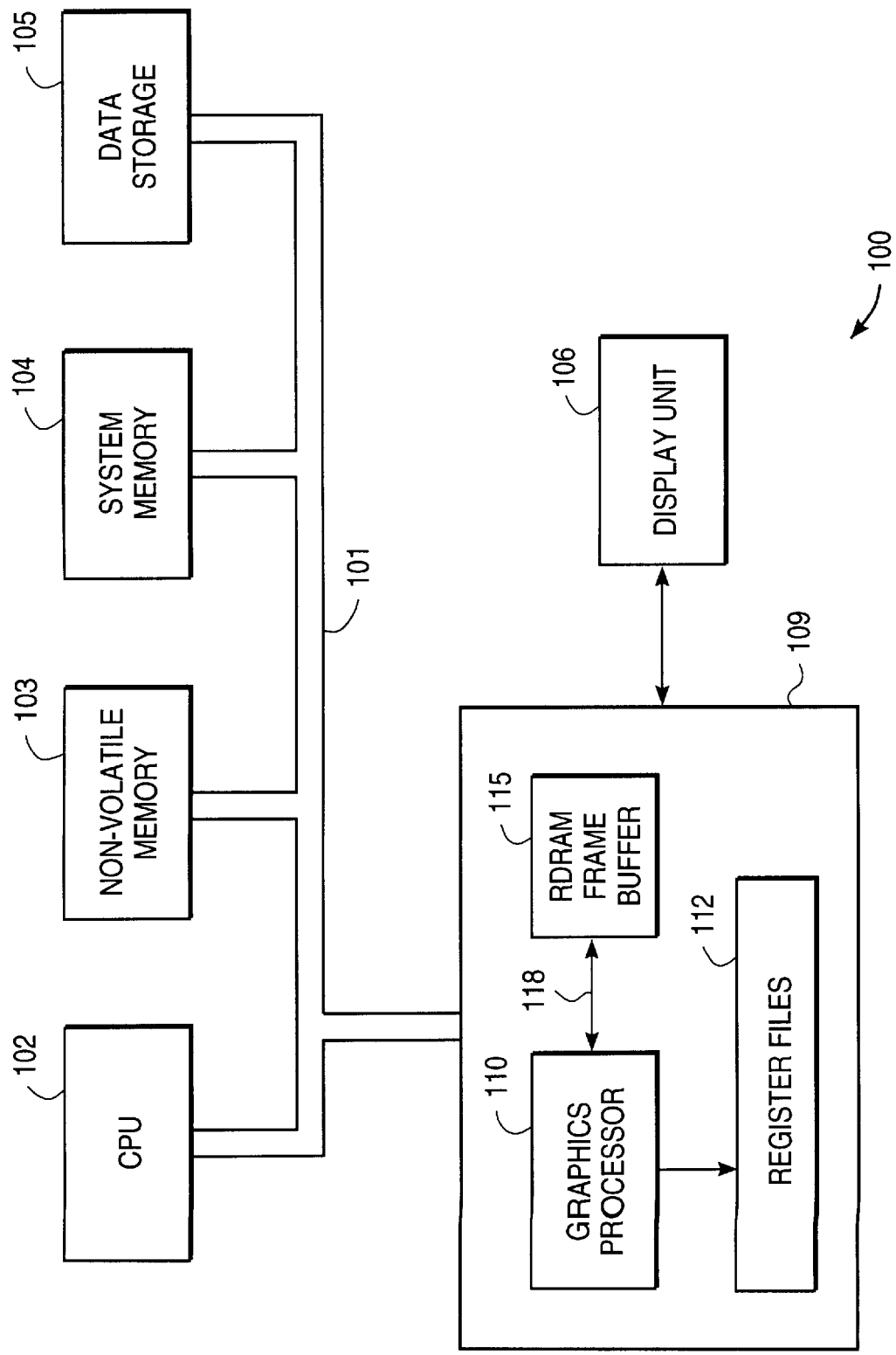
FIG. 1 is a simplified block diagram of a graphics processor coupled to a system bus of a computer system, in accordance with the principles of the present invention.

With reference to FIG. 1, a block diagram is shown of a host computer system 100 used by the preferred embodiment of the present invention. In general, host computer 100 comprises a bus 101 for communicating data and instructions, a host processor (CPU) 102 coupled to bus 101 for processing data and instructions, a computer readable non-volatile memory unit 103 coupled to bus 101 for storing data and instructions from the host a system memory 104, a computer readable data storage device 105 coupled to bus 101 for storing data and display device 106 coupled to bus 101 for displaying information to the computer user. The display device 106 utilized with the computer system 100 of the present invention can be a liquid crystal device, cathode ray tube, or other display device suitable for creating graphics images and alphanumeric characters recognizable to the computer user.

Figure 2:
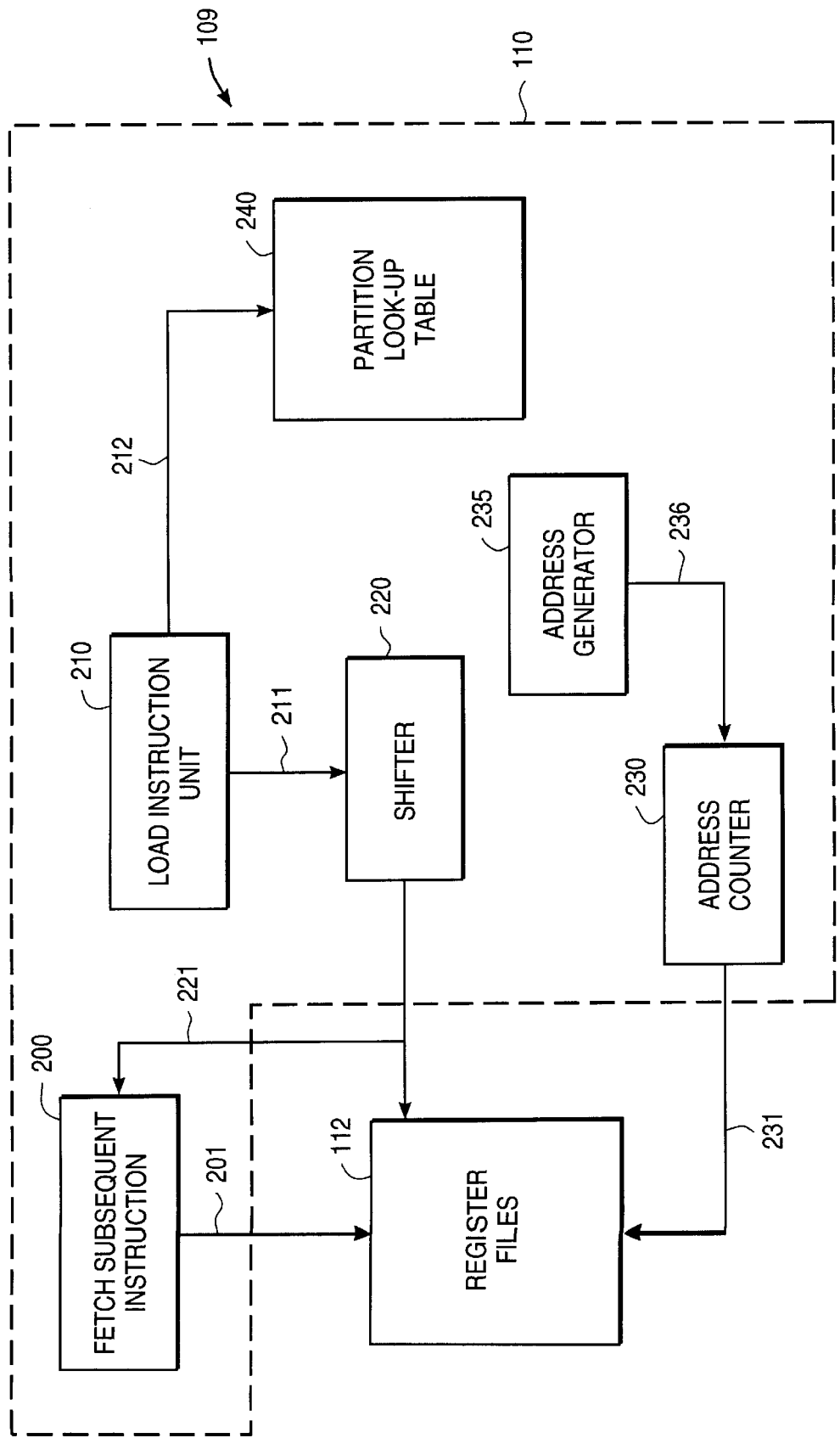
FIG. 2 is a simplified block diagram showing in more detail a portion of the graphics subsystem of FIG. 1.

The host system 100 provides data and control signals via bus 101 to a graphics hardware subsystem 109 (FIG. 2). The graphics hardware 109 includes a graphics display processor 110 which executes a series of display instructions found within a display list. The graphics display processor 110 supplies data and control signals to a frame buffer which refreshes the display device for rendering images on display device. Alternatively, the host processor 102 may write the display list to the graphics processor 110 in accordance with known techniques.

It should be understood that the particular embodiment shown in FIG. 1 is only one of many possible implementations of a graphics system for use in a computer system. FIG. 1 is simplified for purposes of clarity so that many components and control signals are omitted which are not necessary to understand the present invention.

In the preferred embodiment, the graphics processor 110 provides hardware support for 2D and 3D graphics, and for text and windowing operations of a computer system. The graphics processor 110 transfers digital data from the system memory 104 or host processor 102, and processes data for storage in the RDRAM 115 ultimately for display on the display unit 106.

In accordance with the preferred embodiment, the host processor 102 provides necessary parameter values in the form of a display list, which typically is stored in system memory 104 until required by graphics processor 110.

The host processor 102 and system memory 104 both preferably communicate with the graphics processor 110 via the system bus 101. The system bus 101 may comprise any one a plurality of different types of host or input/output (I/O) buses, including the industry standard architecture (ISA), the extended ISA (EISA), the peripheral component interconnect (PCI) and any other standardized system bus of a computer system.

Still referring to FIG. 1, the graphics processor 110 couples to the system bus 101. In accordance with the preferred embodiment, the graphics processor 110 preferably includes bus mastering capabilities, thus permitting graphics processor 110 to bus master the system bus 101. Graphics processor 110 also couples to the display unit 106 and a RDRAM 115. In the preferred embodiment, the RDRAM comprises a bank of RDRAM buffers, where the digital data stored in the RDRAM comprises a rectangular array of picture elements referred to as pixels or pixel values. Each pixel can be defined by an 8 bit value, for example, which specifies the intensity of a single color of a corresponding pixel on a screen of the display unit 106.

The graphics device 109 hosts an array of volatile memory unit referred to as register file 112. The register file 112 holds working information of the graphics device. The register file 112 also stores information and commands needed for operation of the graphics device 109.

The display unit 106 may be any suitable type of display device, such as a cathode ray tube (CRT) for desktop, workstation or server applications, a liquid crystal display (LCD) or any other suitable display device for a personal computer.

The RDRAM frame buffer provides a performance improvement by permitting faster access to display list instructions and pixel data, compared to accessing data stored in the main memory 104 of the host computer system 100. The graphics processor 110 communicates to the RDRAM buffer 115 through address data and control lines, collectively referred to as a RBUS 118.

Referring now to FIG. 2, the graphics subsystem 109 preferably includes a register file 112, a graphics processor 110 and a frame buffer 115. Generally the register files 112 comprises a plurality of registers for storing the display list information. The register address generator generates the address pertaining to a register being accessed for display list information to be displayed.

The graphics processor 110 comprises a fetch subsequent parameters unit 200, a load instruction unit 210, a "right to left" shifter unit 220, an address counter 230 an address generator 235 and a partition look-up table unit 240.

The field load instruction unit 210 comprises a plurality data bit locations for storing load bit data for performing the display list load instruction in the graphics processor. A detailed description of the field load instruction is given in FIG. 3A below.

The fetch subsequent instruction parameter unit 200 is coupled to the register files 112, and operates to fetch subsequent display list instructions after a first instruction has been processed. The fetch subsequent parameters unit is activated by the assertion of request for next parameter lines 201 by the graphics processor 110. When the fetch subsequent parameter 200 detects that request for the next parameter lines 201 have been asserted, display list data is driven on data line 221 to the register file 112 for subsequent write operation to the CPU.

Field Load instruction unit 210 is coupled to shifter 220 to pass load instructions to the register file 112. Field load instruction unit 210 comprises a plurality of data bits of a specified value each of which defines an operation to be performed by the graphics processor 110 in processing the display list. The field load instruction unit 210 passes data to shifter 220 when write enable signal lines 211 are asserted.

The Write Enable signal lines 211 are assumed to be the topmost bit position in shifter 220. At each internal clock cycle of the graphics processor 110, the Write Enable signal 211 is propagated to the register file 112 and to the subsequent parameter fetch unit 200 to fetch subsequent graphics parameters.

If the Write Enable signal 211 is asserted (i.e., having a bit value of "1"), the register file 112 stores the data provided by the fetch subsequent parameter unit 200 in a register address provided by the address generation unit via the address counter 230.

If the Write Enable signal 211 is reset (i.e., having a binary value of "0"), all writes to the register file 112 are disabled and the subsequent parameter fetch unit 200 fetches new parameters from the display list. The shifter 220 shifts its contents one (1) bit to the left following either a write enable or a write disable operation to the register file 112. Shifting bits in the shifter 220, in this manner, allows the next bit of a Write Enable operation to generate a write/skip signal to the register file 112. Consequently, the register files 112 is randomly loaded depending on whether the write enable data bit is set or not.

Address counter 230 is coupled to the register file 112 and the address generation unit 235 to incrementally load new request addresses to the register file 112. The address counter 230 continues to generate new addresses to the register file 112 until the field load instruction contained in a display list are completely executed.

Still referring to FIG. 2, partition look-up table 240 comprises a plurality of preloaded addresses which offset into the register file 112. The partition look-up table 240 is loaded with new address after each display list has been completely processed by the graphics processor 110. The partition table is coupled to the field load instruction unit. Portions of the field load instruction unit 210 reference the contents of the partition table 240.

In the preferred embodiment of the present invention, the partition lookup table 240 comprises 64 entries each of which is addressed by a partition data bit in the load instructions.

In its basic implementation, the look-up table 240 contains the addresses of 64 registers which are evenly distributed across the 1024 register set of the register files 112. Thus, each field load instruction only needs 6 bits to specify the starting partition of the register file 112 to load the display list thereby shortening the display list. The field load instruction also allows the register files 112 to be randomly loaded.

Figure 3A:
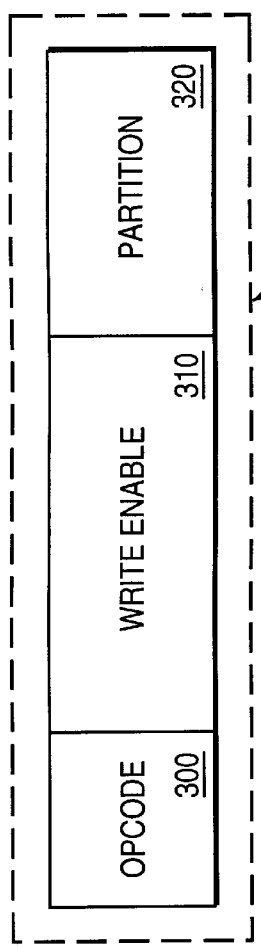
FIG. 3A is a simplified block diagram of the field load instruction unit FIG. 2.

Referring to FIG. 3A is a simplified block diagram of a load instruction of the preferred embodiment. The load instruction shown in FIG. 3A comprises an opcode field 300, a write enable field 310 and a partition field 320.

The field load instruction of the preferred embodiment can load all, and only the registers required by a display list. The instruction stream of an exemplary load instruction looks as follows: "Field Load (write enables: 110111001), (partition starts at X), X, Y, R, G, B, A". This data stream, unlike the prior art, is only 7 instructions word long (28 bytes). The write enable field 310 contained in the load instruction, which read from left to right, allows writes (binary 1s) only on desired registers of the register files 112. The registers that are not to be set are skipped.

Still referring to FIG. 3A, the opcode field 300 stores data of a distinctive bit pattern which recognizes the "field load" instruction from other instructions in the display list information by the graphics processor 110. In the preferred embodiment of the present invention, the opcode is kept short to leave more space for the "write enable" and the "partition" field respectively.

The write enable field 310 stores data bits which may be set to enable or disable register write operations of the load instruction to the register files 112. In the present invention, the setting of the write enable bit-field allows the register files 112 to be randomly loaded with the display parameter values. For example, if the write enable bit-field in a particular load instruction is enabled, the corresponding register location in the register files 112 is loaded with the display parameters.

Alternatively, if the write enable bit-field 310 is disabled, the write to the register files 112 will be disabled and the circuit which fetches subsequent parameters will request a next parameter fetch from the display list. Consequently, the corresponding register position is skipped in the register files 112. Thus, depending on the contents of the write enable bit-field position in a load instruction, corresponding register locations may be written or skipped.

The partition bit-field portion of the load instruction stores data bits which indexes to the partition look-up table.

Figure 3B:
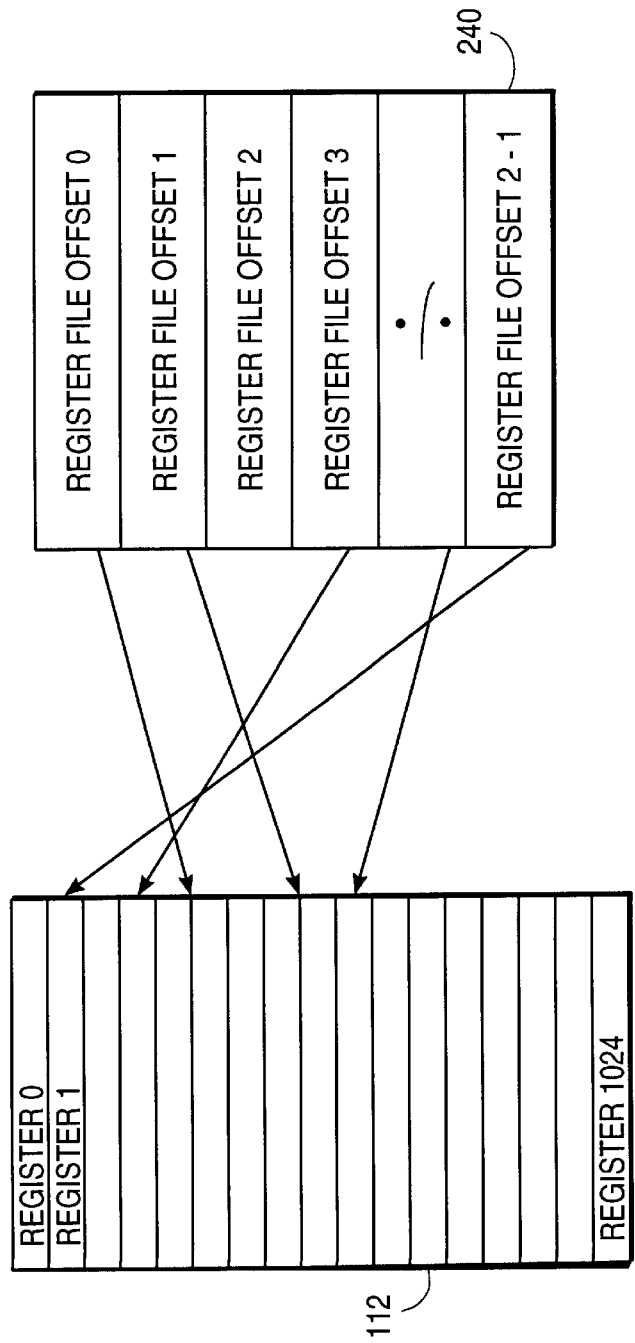
FIG. 3B is a simplified block diagram of the partition look-up table of FIG. 2.

FIG. 3B is a simplified block diagram illustrating an exemplary embodiment of the partition look-up table of the present invention. The partition look-up table 240 shown in FIG. 3B comprises of 64 entries of preloaded address offsets to the register files 112. In the preferred embodiment, register files 112 comprises 1024 entries.

In order to address a particular register in the register files 112, prior art methods of addressing needed 10 binary bits of data to load each register. In the present implementation of the load instruction, partition look-up table 240 allows the register files 112 to be addressed with only 6 bits of data. The 64 entries in the partition look-up table 240 are evenly distributed across the register files 112 as shown in FIG. 3B.

Figure 4:
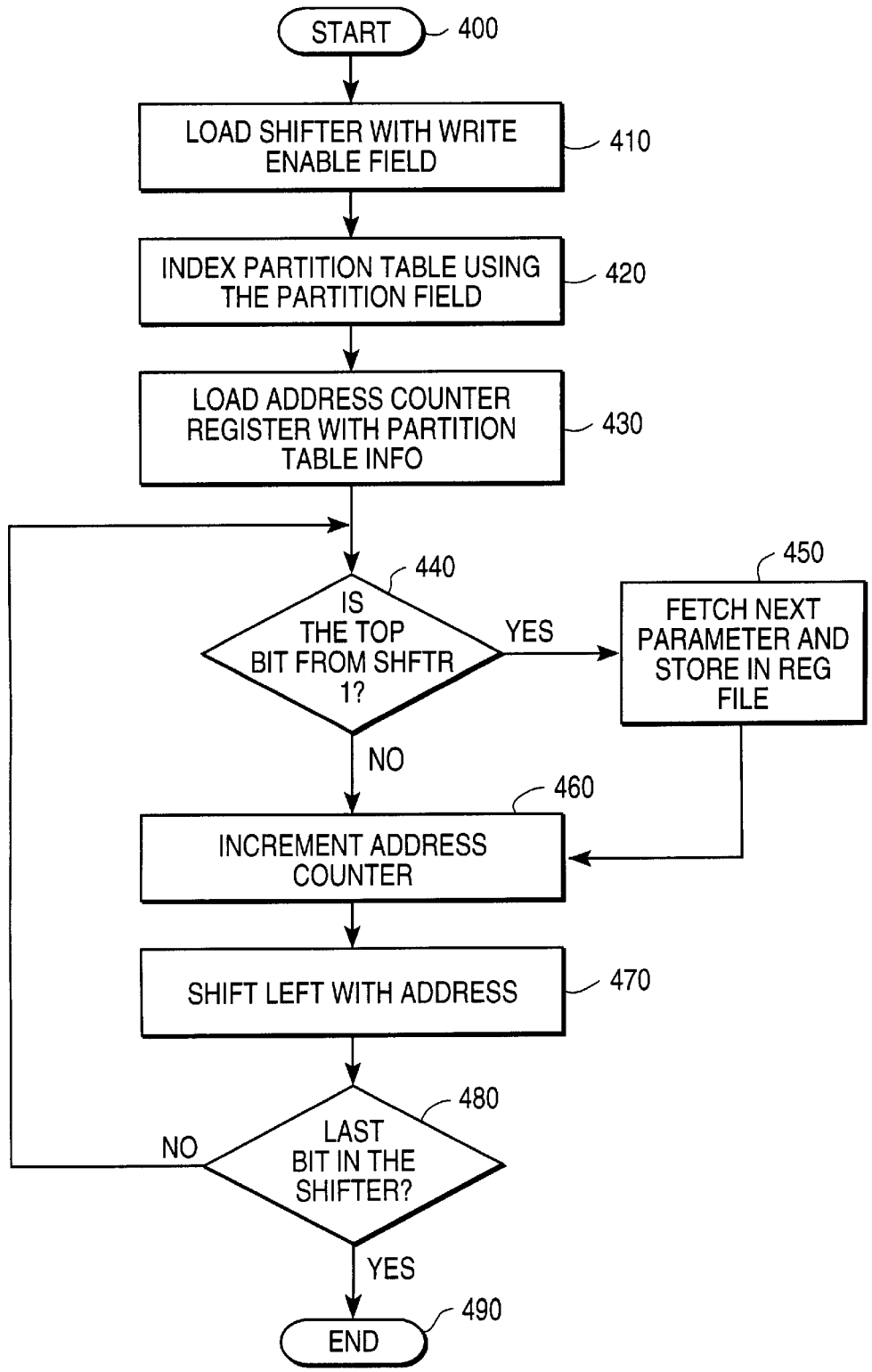
FIG. 4 is a flow diagram of the display list shortening process of the present invention.

Referring to FIG. 4, is a simplified block a flow process of the preferred embodiment of the present invention. The diagram shown in FIG. 4 illustrates the execution of the "Field load" instruction. First at step 410, shifter 220 is loaded with the Write Enable data from the Write Enable field of the load instruction.

At step 420, the partition table is indexed using the partition instruction data bit from the load instruction. A base address of the first register in the register file 112 is then retrieved from the partition table 240 and loaded into the address counter 230 at step 430.

At step 440, the top bit of the shifter 220 is examined to determine whether the addressed register must be loaded or not. If the top-bit in shifter 220 is set, then the subsequent parameter fetch unit fetches the next parameter from the display list at step 450 and stores the retrieved data in the register file 112.

If the top-bit in shifter 220 is not set, then the address counter 230 increments the address count at step 460.

At step 470, shift register 220 is shifted one bit to the left after address counter 230 has been increased 1 bit. After the shifter has been shifted a bit, the contents of shifter 220 are examined to determine if it is empty at step 480. If the shifter 220 is empty processing of a current display list end at step 490. If, on the other hand, there is more data in the shifter 220, the graphics processor 110 continues to execute the current display list at step 440. The effect of loading the shifter 220 and incrementing the address count is to effectively load multiple register in the register file 112 randomly at once. Random loading of the register files 112 in this manner effectively shortens the display list compared to the traditional way of loading instructions in a sequential or contiguous manner.

Thus a method and an apparatus for shortening display list instruction through a random loading of register files is disclosed. The preferred embodiment of the present invention is described for illustrative purposes, numerous other variations of the disclosed embodiments will be apparent to those skilled in the art once the above disclosure is fully appreciated. It is intended that the following claims be interpreted to embrace all such modification and variations.

What is claimed is:

1. A graphics system for storing display list values in a register file, wherein the display list is shortened to enable fast processing time while maintaining the quality of information contained in the display list, the graphics system comprising:

a register file, for storing at least one set of parameter values, the register file comprising a plurality of registers;

a load instruction unit, for storing an instruction having an opcode portion that specifies a rendering operation, and a write-enable portion that spans a plurality of bits, wherein a first bit corresponds to a target starting register file address and subsequent bits sequentially correspond to register file addresses that follow the target starting register file address;

a shifter coupled to receive the write-enable portion, wherein the shifter sequentially performs single-bit shifts upon the contents of the write-enable portion; and a rendering parameter storage controller coupled to the shifter and the register file, wherein the rendering parameter storage controller sequentially steps through register file addresses as write-enable portion bits are considered by the shifter, and stores a display list value in the register file in response to a write-enable portion bit under consideration by the shifter having a predetermined value.

2. The graphics system of claim 1, further comprising a partition table having a set of addressable storage locations, the contents of each storage location specifying a starting register file address, wherein the instruction further includes a partition portion that specifies a partition table address, and wherein the target starting register file address is indexed via the partition portion.

3. In a computer system having a graphics controller, a method for storing display list values in a register file comprising a plurality of addressable registers, wherein the display list is shortened to enable fast processing time while maintaining the quality of information contained in the display list, each display list value corresponding to a graphics primitive, the method comprising the steps of:

retrieving an instruction that includes an opcode portion and a write-enable portion, the opcode portion specifying a rendering operation, the write-enable portion spanning a plurality of bits, wherein a first bit corresponds to a target starting register file address, and subsequent bits sequentially correspond to register file addresses that follow the target starting register file address;

sequentially examining each bit within the write-enable portion; and storing a display list value in the register file in response to a write-enable portion bit under examination having a predetermined value.

4. The method of claim 3, wherein a parameter value is selectively stored at a register file address given by the target starting register file address offset by a number of addresses equal to the position of a write-enable portion bit under consideration relative to the first bit within the write-enable portion.

5. The method of claim 3, wherein the instruction further includes a partition portion that specifies an address within a partition table comprising a set of addressable storage locations, the contents of each storage location specifying a starting register file address, the method further comprising the step of determining the target starting register file address using the partition portion.

* * * * *